June 29, 1948.                J. F. KIMMEY                2,444,353
                              PIPE ROLLER
                         Filed Sept. 12, 1946
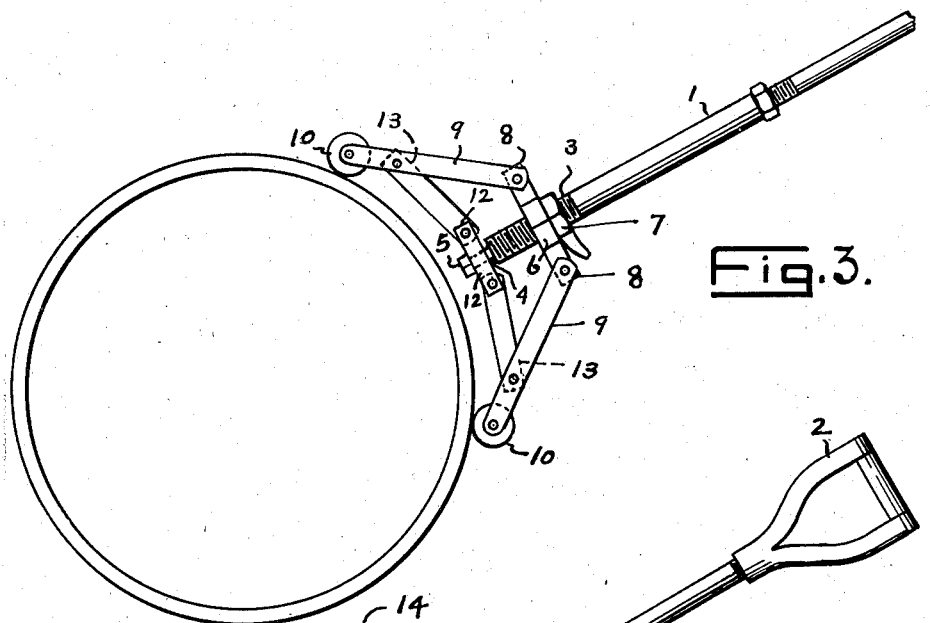
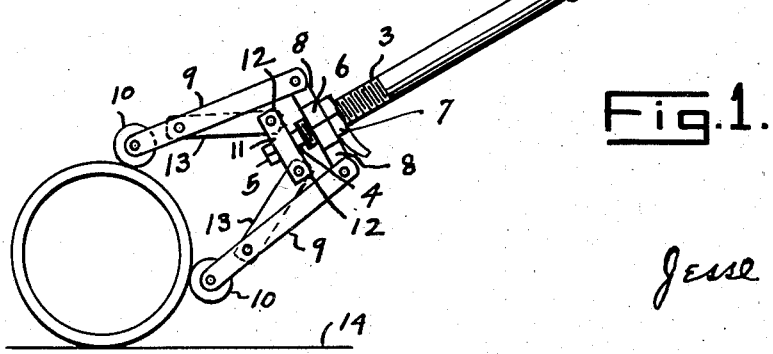

Patented June 29, 1948

2,444,353

UNITED STATES PATENT OFFICE 2,444,353

PIPE ROLLER

Jesse F. Kimmey, Houston, Tex.

Application September 12, 1946, Serial No. 696,422

2 Claims. (Cl. 294—4)

This invention relates to a pipe roller.

An object of the present invention is to provide an implement of the character described specially designed for rolling heavy pipe, on a pipe rack, into position to be stacked.

It is another object of the present invention to provide a pipe roller that may be readily adjusted for application to pipes of different diameters.

In stacking heavy pipe on pipe racks it is common practice for two workmen, one at each end, to roll the pipe on the rack by hand, often resulting in injury to the hands of the workmen. The implement herein described has been designed for use in accomplishing such work and reducing the liability of injury to the workmen and whereby the pipe may be more conveniently rolled.

Other advantages will be apparent from the following specification which is illustrated by the accompanying drawings wherein—

Figure 1 is an elevational view of the roller, as applied to a pipe of relatively small diameter.

Figure 2 is a side view thereof, and,

Figure 3 is an elevational view of the roller adjusted to accommodate it to pipe of larger diameter.

Referring now more particularly to the drawing wherein like numerals of reference designate the same part in each of the figures the numeral 1 designates the handle which, if desired, may be composed of sections adjustably connected together so that the handle may be adjusted to a convenient length.

Secured to one end of the handle there is the grip member 2.

The other end of the handle has the external threads 3 and the reduced blank extension 4 which terminates in an enlarged head 5.

Screwed onto the external threads 3 of the handle there is a yoke 6 which may be adjusted along the handle and secured at any selected point of adjustment by the lock nut 7.

The yoke 6 has the oppositely disposed extensions 8, 8.

There are the pairs of spaced arms 9, 9, the arms of the respective pair being pivoted, at one end, on opposite sides of the extensions 8, 8, and mounted to rotate between the other ends of the respective pair are the disc like rollers 10, 10 adapted to bear against the surface of the pipe to be rolled.

Mounted to swivel on the blank extension 4 there is a smaller yoke 11 which is retained against detached by the head 5 and which has the oppositely disposed extensions 12, 12.

There are the toggle links 13, 13 which are pivoted at one end to the extensions 12, 12 and their other ends are pivoted between the outer ends of the respective pairs of arms 9.

By loosening the lock nut 7 and screwing the handle 1 forwardly through the yoke 6 the toggle links 13 will operate to spread the rollers 10 so as to adapt them to pipes of larger diameter, as shown in Figure 3, and by screwing the handle 1 in the reverse direction through the yoke 6 the toggle links 13 will pull the rollers 10 toward each other, as shown in Figure 1, to adapt them to pipe of smaller diameters.

In use a roller may be applied by two workmen, one at each end, to the pipe and the pipe thus easily and safely rolled on the rack 14 to any desired location.

The drawings and description are illustrative merely while the broad principle of the invention will be defined by the appended claims.

What I claim is:

1. An implement of the character described comprising a handle, a yoke threaded onto one end of the handle, arms pivoted, at one end, to said yoke, rollers on the other ends of said arms, a yoke mounted to swivel on said end of the handle and links pivoted on one end to said last mentioned yoke and at their other ends to the said arms.

2. An implement of the character described comprising a handle, a yoke threaded onto one end of the handle, a lock nut for locking said yoke at any point of adjustment on the handle, diverging arms pivoted, at one end, to said yoke, rollers mounted on the other ends of said arms, a yoke having a swivel connection with said end of the handle and toggle links connecting said arms with said last mentioned yoke.

JESSE F. KIMMEY.

REFERENCES CITED

The following references are of record in the file of this patent:

UNITED STATES PATENTS

| Number | Name | Date |
| --- | --- | --- |
| 147,028 | Thorn | Feb. 3, 1874 |
| 345,034 | Dittrick | July 6, 1886 |
| 2,280,422 | Harcos | Apr. 21, 1942 |